(12) United States Patent
Ryu et al.

(10) Patent No.: US 9,480,001 B2
(45) Date of Patent: Oct. 25, 2016

(54) METHOD AND APPARATUS FOR CONTROLLING NETWORK ACCESS IN A WIRELESS COMMUNICATION SYSTEM

(71) Applicant: LG ELECTRONICS INC., Seoul (KR)

(72) Inventors: Kiseon Ryu, Anyang-si (KR); Sanggook Kim, Anyang-si (KR); Ki-Dong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 14/395,019

(22) PCT Filed: Apr. 29, 2013

(86) PCT No.: PCT/KR2013/003675
§ 371 (c)(1),
(2) Date: Oct. 16, 2014

(87) PCT Pub. No.: WO2013/165139
PCT Pub. Date: Nov. 7, 2013

(65) Prior Publication Data
US 2015/0124594 A1    May 7, 2015

Related U.S. Application Data

(60) Provisional application No. 61/640,658, filed on Apr. 30, 2012.

(51) Int. Cl.
*H04W 48/06* (2009.01)
*H04W 74/08* (2009.01)
(Continued)

(52) U.S. Cl.
CPC .............. *H04W 48/06* (2013.01); *H04W 4/005* (2013.01); *H04W 28/0215* (2013.01); *H04W 74/008* (2013.01); *H04W 74/0833* (2013.01); *H04W 74/0875* (2013.01); *H04W 28/02* (2013.01)

(58) Field of Classification Search
CPC ........... H04W 48/06; H04W 74/0833; H04W 74/008; H04W 4/005; H04W 28/0215; H04W 16/08; H04W 72/0486; H04W 72/1252; G06F 9/505; H04L 12/569; H04L 29/08171
See application file for complete search history.

(56) References Cited

U.S. PATENT DOCUMENTS 6,351,456 B1 * 2/2002 Struhsaker .............. H04L 1/007
370/280
9,197,482 B1 * 11/2015 Bharghavan ........ H04L 41/5009
(Continued)

FOREIGN PATENT DOCUMENTS

| WO | 2004/019630 | 3/2004 |
|----|-------------|--------|
| WO | 2011/019551 | 2/2011 |
| WO | 2011/086097 | 7/2011 |

OTHER PUBLICATIONS

PCT International Application No. PCT/KR2013/003675, Written Opinion of the International Searching Authority dated Aug. 23, 2013, 10 pages.

*Primary Examiner* — Warner Wong
(74) *Attorney, Agent, or Firm* — Lee, Hong, Degerman, Kang & Waimey

(57) ABSTRACT

The present invention is directed to a wireless communication system. Specifically, the present invention is directed to a method of controlling network access and an apparatus therefore, wherein the method comprises: receiving a first field for indicating network overload situation and a second field for indicating a network access priority; and receiving at least one of a N-bit field for indicating a first back-off window and a M-bit field for indicating a second back-off window, wherein if a configured priority is equal to or higher than the network access priority, a random access (RA) procedure is performed using the first back-off window, wherein if the configured priority is lower than the network access priority, the RA procedure is selectively barred or performed using at least one of the first back-off window and the second back-off window.

14 Claims, 10 Drawing Sheets

(51) Int. Cl.
   *H04W 4/00*     (2009.01)
   *H04W 74/00*    (2009.01)
   *H04W 28/02*    (2009.01)

(56) References Cited

U.S. PATENT DOCUMENTS

2011/0199905 A1* 8/2011 Pinheiro ............... H04W 4/005
                                                   370/235

2012/0033613 A1* 2/2012 Lin ..................... H04W 74/085
                                                   370/328
2012/0051297 A1* 3/2012 Lee ..................... H04W 74/006
                                                   370/329
2012/0163265 A1* 6/2012 Kotecha .............. H04W 74/006
                                                   370/312
2012/0282965 A1* 11/2012 Kim ..................... H04W 48/06
                                                   455/515
2014/0308965 A1* 10/2014 Benveniste ........... H04W 56/00
                                                   455/450

* cited by examiner

METHOD AND APPARATUS FOR CONTROLLING NETWORK ACCESS IN A WIRELESS COMMUNICATION SYSTEM

CROSS-REFERENCE TO RELATED APPLICATIONS

This application is the National Stage filing under 35 U.S.C. 371 of International Application No. PCT/KR2013/003675, filed on Apr. 29, 2013, which claims the benefit of U.S. Provisional Application Ser. No. 61/640,658, filed on Apr. 30, 2012, the contents of which are all hereby incorporated by reference herein in their entirety.

TECHNICAL FIELD

The present invention is directed to a method and an apparatus for being used in a wireless communication system. Specifically, the present invention is directed to a method and an apparatus of controlling network access. The wireless communication system can provide Machine-to-Machine (M2M) services.

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). The multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system and any combination thereof.

Machine to Machine (M2M) communications involve the communication (using wired or wireless means, or a combination of both) between two machines without human intervention. The term "M2M communication" is also referred to as "Machine Type Communication (MTC)", or Device-to-Device (D2D) communication in certain literature. However, for consistency, only the term "M2M communication" is used herein. Some examples of M2M communications are: smart metering (e.g., remote reading of a utility meter), healthcare monitoring (e.g., remote monitoring of a patient's heart rate), agricultural monitoring (e.g., monitoring of a crop condition), fleet management tracking (e.g., monitoring current status of trucks on the road), security surveillance (e.g., automatic, real-time monitoring of a building or complex), billing transactions, inventory management (e.g., through monitoring of Point of Sale (POS) transactions in a supermarket) and the like. M2M communications typically use M2M communications-capable sensors or diagnostic devices (which may perform the metering, monitoring, etc., mentioned earlier) on one end and an M2M user device or receiver on the other end to receive data from the sensor devices and process the data.

DISCLOSURE

Technical Problem

An object of the present invention is to provide a method and an apparatus of efficiently resolving network access congestion in a wireless communication system. Another object of the present invention is to provide a method and an apparatus of efficiently controlling network access, particularly random access procedure for the network access. The wireless communication system can provide M2M services, and the network congestion/access may be for the M2M services.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of controlling network access at a wireless device in a wireless communication system is provided, in which the method comprises: receiving a first field for indicating network overload situation and a second field for indicating a network access priority; and receiving at least one of a N-bit field for indicating a first back-off window and a M-bit field for indicating a second back-off window, wherein if a configured priority is equal to or higher than the network access priority, a random access (RA) procedure is performed using the first back-off window, wherein if the configured priority is lower than the network access priority, the RA procedure is selectively barred or performed using at least one of the first back-off window and the second back-off window.

As another aspect of the invention, a wireless device for used in a wireless communication system is provided, in which the wireless device comprises: a radio frequency unit; and a processor, wherein the processor is configured to: receive a first field for indicating network overload situation and a second field for indicating a network access priority; and receive at least one of a N-bit field for indicating a first back-off window and a M-bit field for indicating a second back-off window, wherein if a configured priority is equal to or higher than the network access priority, a random access (RA) procedure is performed using the first back-off window, wherein if the configured priority is lower than the network access priority, the RA procedure is selectively barred or performed using at least one of the first back-off window and the second back-off window.

Preferably, the first back-off window may be smaller than the second back-off window.

Preferably, M may be larger than N.

Preferably, if the configured priority is lower than the network access priority and if the first field is set to 1, the RA procedure is barred; and if the configured priority is lower than the network access priority and if the first field is set to 0, the RA procedure is performed using the second back-off window.

Preferably, a third 1-bit field may be further received, wherein if the configured priority is lower than the network access priority and if the third 1-bit field is set to a value, the RA procedure is barred; and wherein if the configured priority is lower than the network access priority and if the third 1-bit field is set to the other value, the RA procedure is performed using the second back-off window.

Preferably, a fourth 1-bit field may be further received, wherein if the configured priority is lower than the network access priority, and if the first field is set to 1, and if the fourth 1-bit field is set to a value, the RA procedure is barred; and wherein if the configured priority is lower than the network access priority and if the fourth 1-bit field is set to the other value, the RA procedure is performed using one of the first back-off window of the second back-off window, based on whether a random-generated value is larger than a threshold value or not.

Preferably, a fifth 1-bit field may be further received, wherein if the configured priority is lower than the network access priority, and if the first field is set to 1, and if the fifth 1-bit field is set to a value, the RA procedure is barred; and wherein if the configured priority is lower than the network access priority and if the fifth 1-bit field is set to the other value, the RA procedure is either barred or performed using the second back-off window, based on whether a random-generated value is larger than a threshold value or not.

Preferably, the wireless device may be a delay-tolerant wireless device.

Advantageous Effects

Exemplary embodiments of the present invention have the following effects. In accordance with the embodiments of the present invention, network access congestion can be efficiently resolved in a wireless communication system. In addition, network access, particularly random access procedure for the network access can be efficiently controlled.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. 3rd Generation Partnership Project 2 (3GPP2) is developing CDMA2000-based technologies including CDMA2000 1×, 1×EV-DO (1× Evolution—Data Optimized, a.k.a HRPD (High Rate Packet Data), xHRPD (eXtended-cell High Rate Packet Data), the set of 3G standards based on the earlier cdmaOne 2G CDMA technologies. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE.

Although the following embodiments of the present invention will hereinafter describe inventive technical characteristics on the basis of the 3GPP2 system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
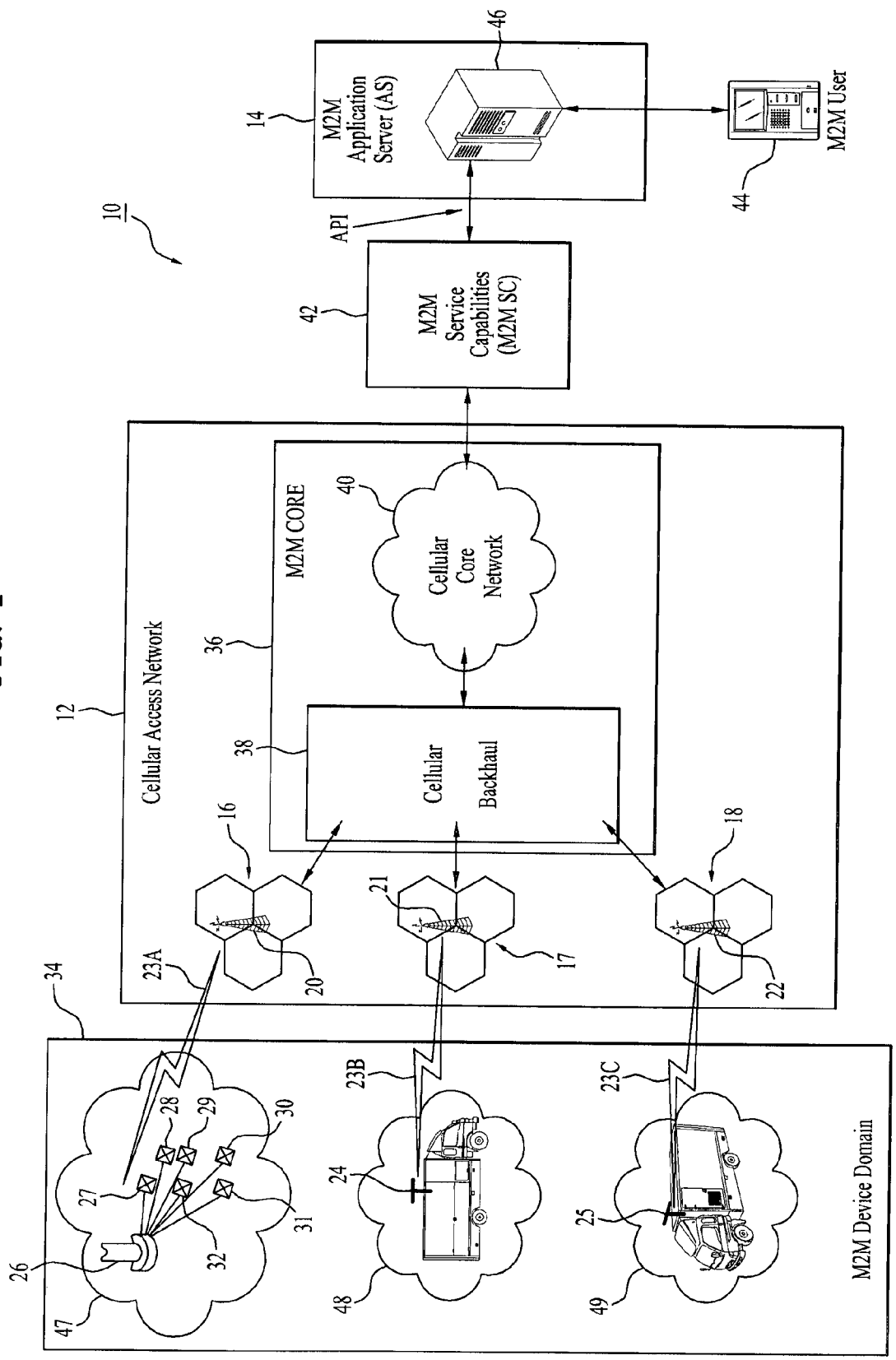
FIG. 1 illustrates an exemplary Machine-to-Machine (M2M) service architecture using a cellular Access Network (AN).

FIG. 1 illustrates an exemplary M2M service architecture 10 using a cellular Access Network (AN) 12. The architecture 10 shows a cellular AN 12 connecting to an M2M Service Provider (SP) network 14. The AN 12 may include a Radio Access Network (RAN) portion (comprising, for example, a base station) of a cellular carrier network, and other portions (e.g., cellular backhaul and core network) as well. Similarly, the terms "M2M Service Provider" or "M2M SP" and "M2M SP network" may be used interchangeably herein to refer to the M2M SP network 14.

Referring to FIG. 1, the cellular AN 12 may include multiple cell sites 16-18, each of which is under the radio coverage of a Base Station (BS) or Base Transceiver Station (BTS) 20-22. Base stations 20-22 may receive wireless signals (via exemplary radio links 23A-23C) from various M2M communication entities 24-32 operating in an M2M device domain 34, and forward the received signals to an M2M core 36 of the cellular network 12. The M2M core 36 may include a cellular backhaul 38 and a cellular Core Network (CN) 40. The backhaul 38 and base stations 20-22 may be considered to comprise the RAN portion of the network 12. The Core Network (CN) 40 may provide logical, service, and control functions (e.g., subscriber account management, billing, subscriber mobility management, etc.), Internet Protocol (IP) connectivity and interconnection to other networks (e.g., the Internet) or entities, roaming support, etc.

In FIG. 1, M2M User 44 (which is also referred to herein as "M2M user device," and may also be referred to as "MTC User" or "D2D User" in certain literature) communicates with the M2M AS 46. The M2M User 44 may be an MTC capable device that can communicate with various M2M communication entities 24-32 and may even (remotely) control or operate them. For example, if an M2M communication entity is a building surveillance sensor or unit, the M2M User 44 in that case may be a remote data collection/processing unit that may instruct the surveillance sensor to transmit surveillance data thereto at predefined time intervals. The combination of M2M AS 46 and the M2M SC 42 may facilitate transfer of relevant application-specific data or other content between the M2M User 44 and respective M2M communication entity/entities.

FIGS. 2~5 illustrate Access Channel (ACH) procedures by a wireless device (e.g., a mobile station). ACH procedure may be used for sending control signaling and short data. ACH procedure is used for various purposes including network access.

Figure 2:
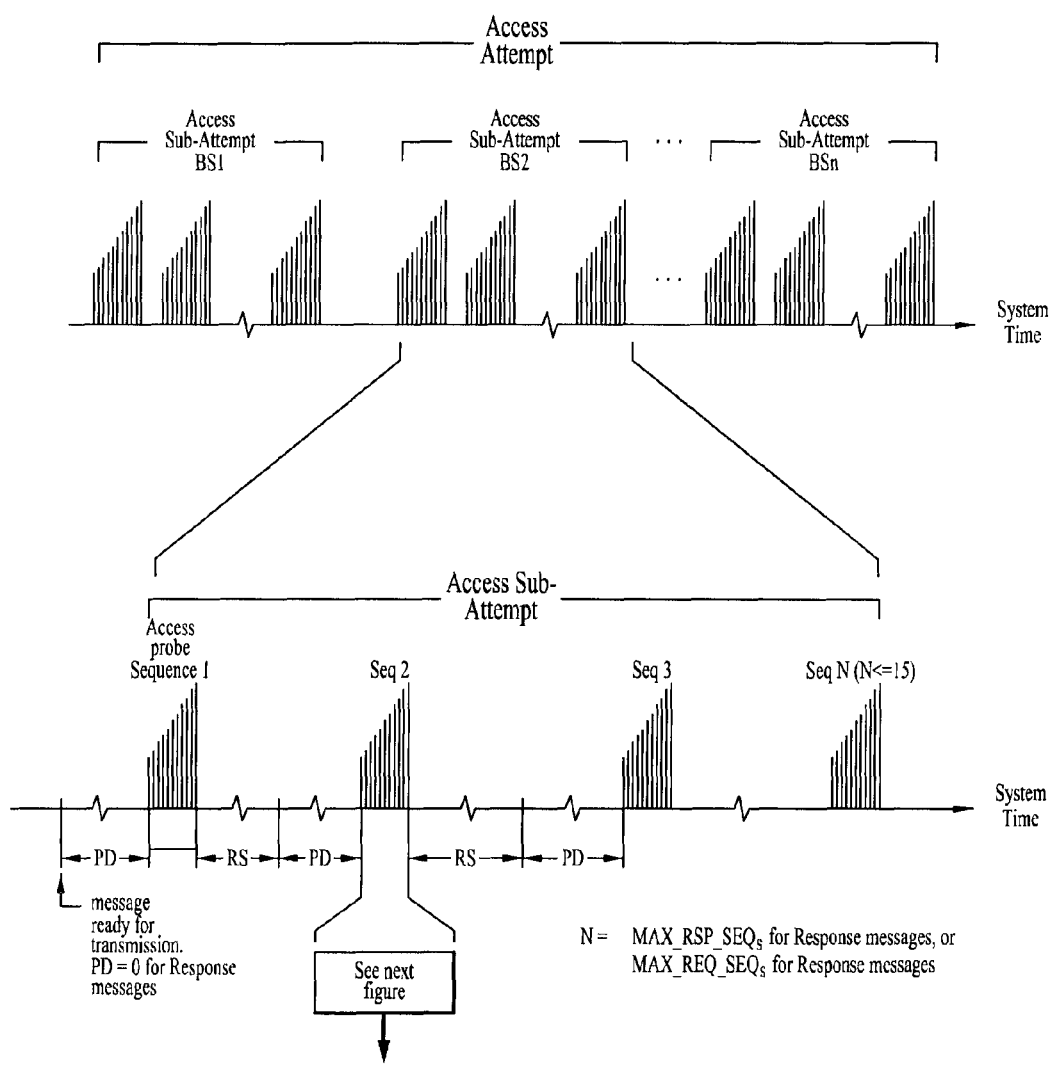
FIGS. 2~3 illustrate an example of access attempt.
Figure 3:
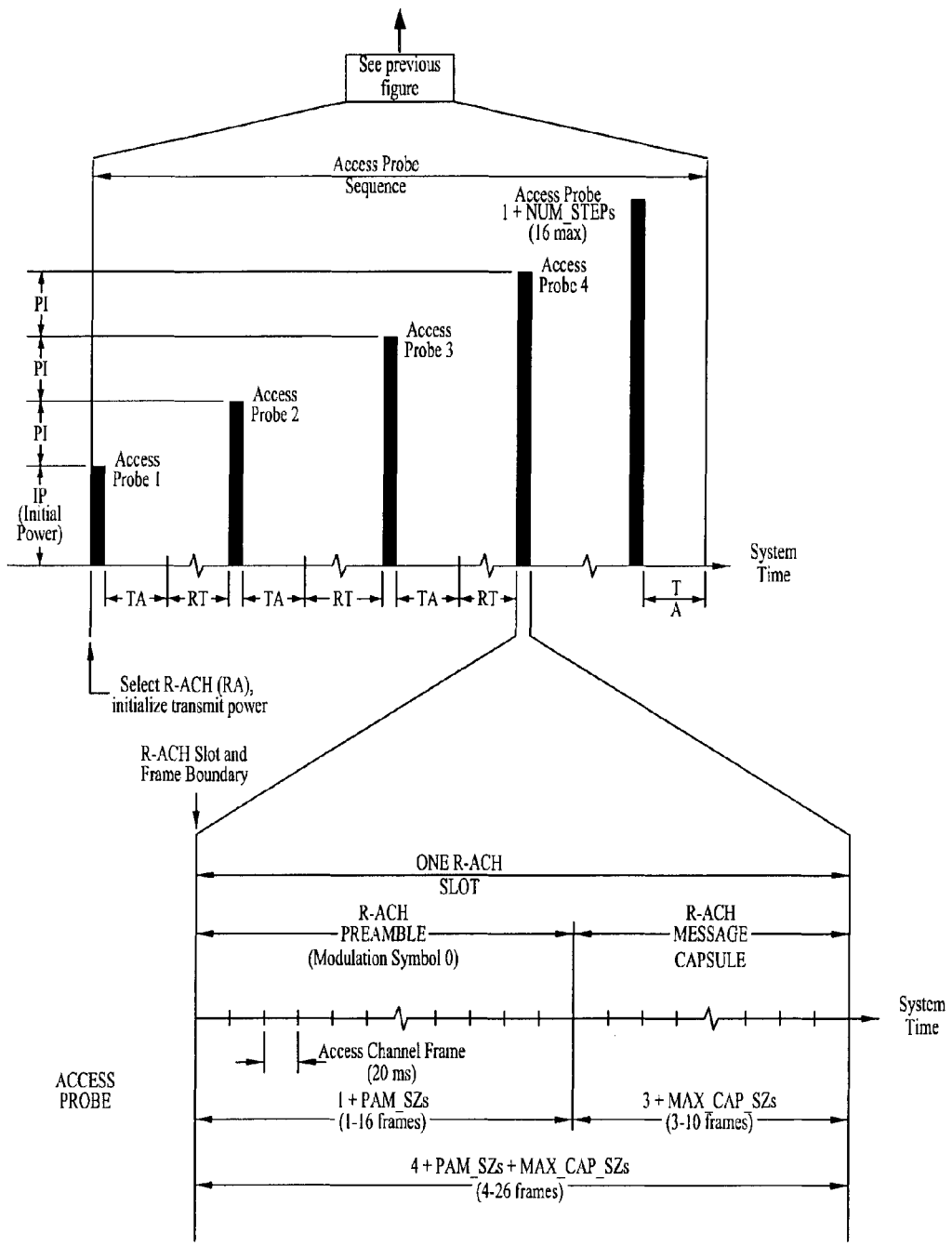

FIGS. 2~3 illustrate an example of access attempt. Access attempt means entire process of sending one Layer 2 encapsulated Protocol Data Unit (PDU) and receiving (or failing to receive) an acknowledgment for the PDU at a mobile station. One access attempt consists of one or more access sub-attempts (FIG. 2). Each transmission in the access sub-attempt is called an access probe (FIG. 3). Each access probe consists of a Reverse Access Channel (R-ACH) preamble and an R-ACH message capsule. In the description, R-ACH is interchangeably used with ACH.

Within an access sub-attempt, access probes are grouped into access probe sequences. The R-ACH used for each access probe sequence is chosen pseudo-randomly from among all the R-ACHs associated with current Forward Paging Channel (F-PCH). If there is only one R-ACH associated with the F-PCH, all access probes within an access probe sequence are transmitted on the same R-ACH. If there is more than one R-ACH associated with the current F-PCH, access probes within an access probe sequence may be transmitted on different R-ACHs associated with the current F-PCH. Each access probe sequence consists of up to 1+NUM_STEPs access probes. The first access probe of each access probe sequence is transmitted at an initial power level determined by a physical layer relative to the nominal open loop power level. Each subsequent access probe within an access probe sequence is transmitted at a power level that is a function of Power Levels (PWR_LVLs), calculated by a Signaling Radio Burst Protocol (SRBP) entity of the mobile station.

Figure 4:
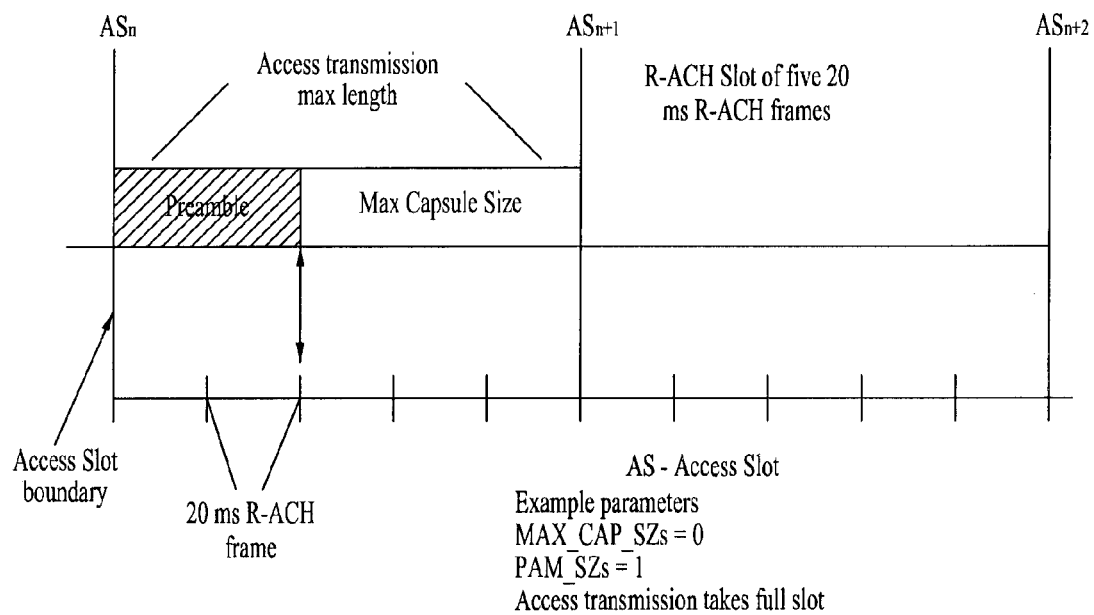
FIG. 4 illustrates an example of R-ACH slot structure.

FIG. 4 illustrates an example of R-ACH slot structure. The timing of access probes and access probe sequences is expressed in terms of 2 R-ACH slots.

Referring to FIG. 4, the transmission of an access probe begins at the start of an R-ACH slot. The timing of the start of each access probe sequence is determined pseudo-randomly. For every access probe sequence, a back-off delay, RS, from 0 to 1+BKOFFs slots is generated pseudo-randomly. In other words, RS means an inter-probe sequence back-off, e.g., delay in slots generated (pseudo-randomly) by the mobile station following an unsuccessful access probe sequence or prior to the first access probe in a response attempt. An additional delay is imposed by the use of a random persistence test that determines the value of the Persistence Delay (PD) based on the parameter P of the MAC-SDUReady.Request primitive.

For each slot after the random back-off delay, RS, the SRBP entity performs a pseudo-random test based on the parameter P of the MAC-SDUReady.Request primitive. If the test passes, the first access probe of the sequence begins in that slot. If the test fails, the access probe sequence is deferred until at least the next slot.

The delay between access probes of an access probe sequence is generated pseudo-randomly. Upon reception of an acknowledgment from the base station, the upper layer terminates the access by no longer sending the MAC-SDUReady.Request primitive.

If a MAC-SDUReady.Request primitive with (seqno mod (NUM_STEPs+1)) not equal to 0 is received:

If all the access probes within an access probe sequence are transmitted on the same R-ACH associated with the current F-PCH, the next access probe is transmitted after an additional random back-off delay, RT, from 0 to 1+PROBE_BKOFFs slots. In other words, RT means an inter-probe back-off, e.g., delay in slots generated (pseudo-randomly) by the mobile station following an unacknowledged access probe.

If an R-ACH is pseudo-randomly selected from among all R-ACHs associated with the current F-PCH, the next access probe is transmitted after an additional random back-off delay, RT, from 0 to PROBE_BKOFFs slots.

The precise timing of the Access Channel transmissions in an access attempt is determined by a procedure called Pseudo-random Number (PN) randomization. For each access sub-attempt, the SRBP entity computes a delay, RN, from 0 to $2^{PROBE\_PN\_RANs}-1$ PN chips using a hash function.

Table 1 shows variables that are related to the random access procedures

TABLE 1

| Variable | Name | Generation | Range | Units |
| --- | --- | --- | --- | --- |
| PD | Persistency Delay | Delay continues slot-by-slot until persistence test (run every slot) passes. | — | slots |
| RA | R-ACH Number | Random between 0 and ACC_CHANs; generated before every access probe sequence or every access probe. | 0 to 31 | — |
| RN | PN Randomization Delay | Hash using RN_HASH_KEYs between 0 and $2^{PROBE\_PN\_RANs} - 1$; generated once at the beginning of each access sub-attempt. | 0 to 511 | chips |
| RS | Sequence Back-off | Random between 0 and 1 + BKOFFs; generated before every sequence of an access sub-attempt (except the first sequence). | 0 to 16 | slots |
| RT | Probe Back-off | Random between 0 and 1 + PROBE_BKOFFs; generated before subsequent probes if the mobile station transmits all access probes within an access probe sequence on the same R-ACH. Random between 0 and PROBE_BKOFFs; generated before subsequent probes if the common channel multiplex sublayer pseudo-randomly selects an R-ACH from among all R-ACHs associated with the current Paging Channel. | 0 to 16 or 0 to 15 | slots |

Figure 5:
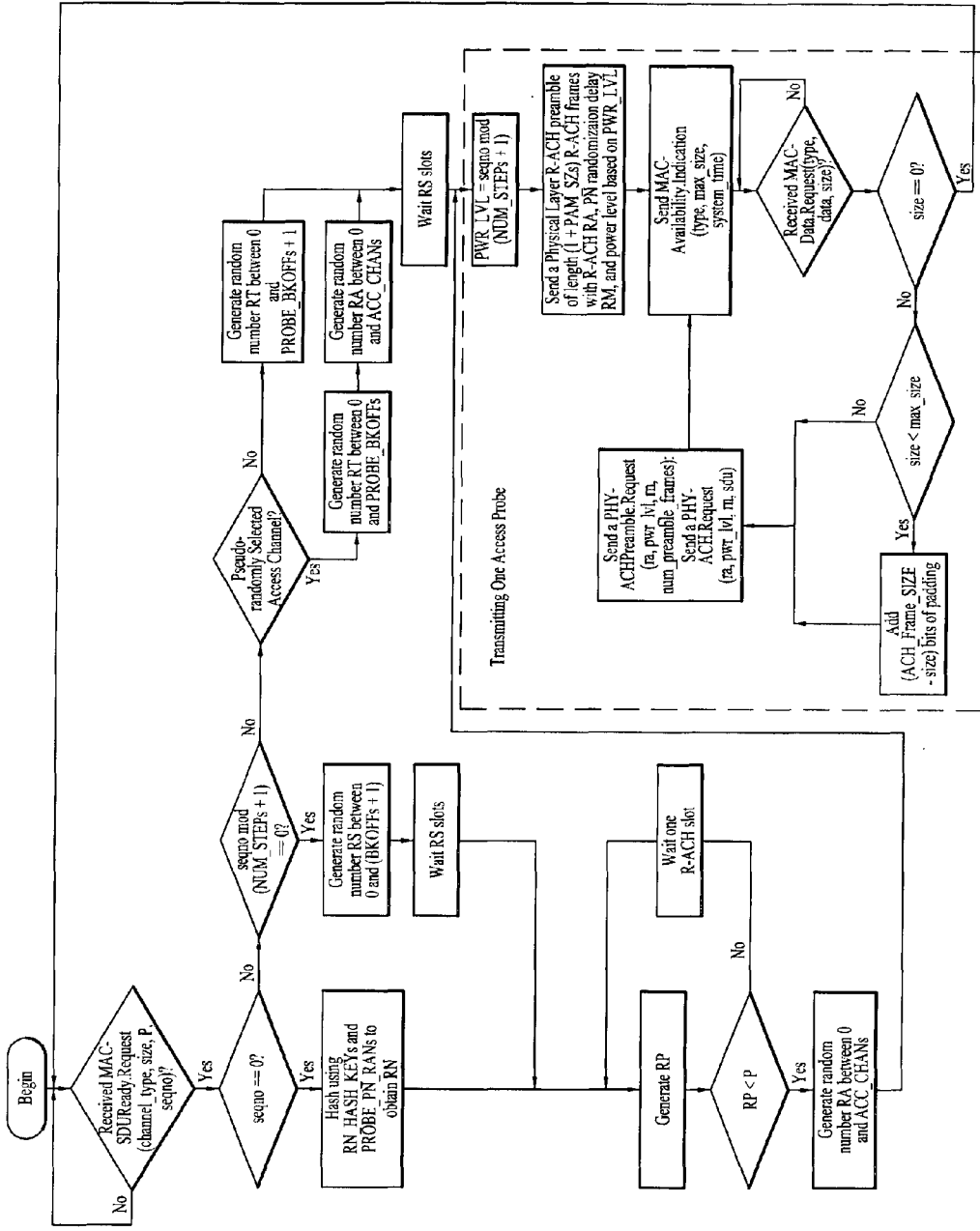
FIG. 5 illustrates an example of random access procedure using R-ACH.

FIG. 5 illustrates an example of random access procedure using R-ACH.

Referring to FIG. 5, upon reception of a MAC-SDU-Ready.Request (channel_type, size, P, seqno) primitive with channel_type set to "ACH frame", the SRBP entity may do the following:

If seqno is equal to 0:
　The SRBP entity sends a MAC-SDUReady.Response (access_mode) primitive with access_mode set to NULL.
　The SRBP entity computes a number, RN, from 0 to $(2^{PROBE\_PN\_RANs}-1)$.
　The SRBP entity performs a persistence test for each R-ACH slot until the test passes. To perform the persistence test, the SRBP entity generates a random number RP, 0<RP<1. The persistence test is said to pass when RP is less than the value of P.
　A common channel multiplex sub-layer generates a random number, RA, from 0 to ACC_CHANs. ACC_CHAN means the number of Access Channels.

If seqno is non-zero and (seqno mod (NUM_STEPs+1)) is equal to 0:
　The SRBP entity generates a random number, RS, from 0 to (BKOFFs+1).
　The SRBP entity waits for RS R-ACH slots and then performs a persistence test for each R-ACH slot until the test passes.
　The common channel multiplex sub-layer generates a random number, RA, from 0 to ACC_CHANs.

If (seqno mod (NUM_STEPs+1)) is non-zero:
　If the common channel multiplex sub-layer transmits all access probes within an access probe sequence on the same R-ACH, the SRBP entity generates a random number, RT, from 0 to 1+PROBE_BKOFFs
　If the common channel multiplex sub-layer pseudo-randomly selects an R-ACH among all the R-ACHs associated with the current F-PCH, the SRBP entity generates a random number, RT, from 0 to PROBE_BKOFFs. If there is more than one R-ACH associated with the current Paging Channel, the common channel multiplex sublayer generates a random number, RA, from 0 to ACC_CHANs.

When transmitting an access probe, the SRBP entity does the following:
　Set PWR_LVLs to (seqno mod (NUM_STEPs+1)).
　　The common channel multiplex sub-layer sends a PHY-ACHPreamble.Request (ra, pwr_lvl, rn, num_preamble_frames) primitive to the physical layer with
　ra set to RA;
　pwr_lvl set to PWR_LVLs;
　rn set to RN; and
　num_preamble_frames set to (1+PAM_SZs).

After the transmission of the preamble, the SRBP entity sends a MAC-Availability.Indication primitive and waits for the reception of the matching MAC-Data.Request primitive, for each R-ACH frame, until all the fragments of the Layer 2 encapsulated PDU are transmitted. When sending the MAC-Availability.Indication primitive, the SRBP entity sets max_size to ACH_FRAME_SIZE, and system_time to the System Time at which the frame will be transmitted.

Upon reception of the MAC-Data.Request (channel_type, data, size) primitive with non-zero size and channel_type set to "R-ACH frame", the SRBP entity performs the following:
　The SRBP entity appends (ACH_FRAME_SIZE_size) '0' bits to data to form a Physical Layer R-ACH SDU.
　The common channel multiplex sub-layer sends a PHY-ACH.Request (ra, pwr_lvl, rn, sdu) primitive to the Physical Layer with:
　　ra set to RA;
　　pwr_lvl set to PWR_LVLs;
　　rn set to RN; and
　　sdu set to the assembled R-ACH SDU.

Besides the ACH procedure of FIGS. 2~5, the access probe can be transmitted as a part of an Enhanced Access Channel (EACH) procedure. The EACH procedure includes basic access mode and reservation access mode, in which the access probe is transmitted via a Reverse Enhanced Access Channel (R-EACH) (basic mode) or a Reverse Common Control Channel (R-CCCH) (reservation access mode). In the description, R-EACH is interchangeably used with EACH. In the basic mode, overall procedure is substantially identical with the ACH procedure, except that enhanced access probe (sequence), R-EACH frame structure and the like are employed instead. Thus, in order to avoid repetitive descriptions, explanations on the basic mode are omitted here and can be referred to explanations of FIGS. 2~5.

The ACH/EACH procedures are performed depending on various access-related parameters. The access-related parameters are broadcast by a base station, by using a message such as an Access Parameters Message (APM), an Enhanced Access Parameters Message (EAPM), a Generic Access Parameters Message (GAPM) and the like.

In particular, access attempts can be performed as follows:
　If the mobile station monitors the Paging Channel, then:
　　If base station does not transmit the Generic Access Parameters Message or the mobile station does not support EACH, then the mobile station transmits on the ACH using a random access procedure. Many parameters of the random access procedure are supplied by the base station in the Access Parameters Message.
　　If base station does transmit the Generic Access Parameters Message and the mobile station supports EACH, then the mobile station transmits on the EACH using a random access procedure. Many parameters of the random access procedure are supplied by the base station in the Generic Access Parameters Message.
　If the mobile station monitors the Forward Common Control Channel/Primary Broadcast Control Channel, the mobile station transmits on the EACH using a random access procedure. Many parameters of the random access procedure are supplied by the base station in the Enhanced Access Parameters Message.

Before the mobile station transmits an access probe to a new base station on the ACH, the mobile station shall update parameters based on the System Parameters Message, the Access Parameters Message and the Extended System Parameters Message on the associated new Paging Channel and process parameters from the messages Before the mobile station transmits an access probe to a new base station on the EACH, if the mobile station is monitoring Primary Broadcast Control Channel, the mobile station shall update parameters based on the Enhanced Access Parameters Message on the associated new Primary Broadcast Control Channel and process parameters from the messages.

Before the mobile station transmits an access probe to a new base station on the EACH, if the mobile station is monitoring Paging Channel, the mobile station shall update parameters based on the Access Parameters Message, and Generic Access Parameters Message on the associated new Paging Channel.

Table 2 shows a part of Access Parameters Message.

TABLE 2

| Field | Length (bits) |
|---|---|
| PILOT_PN | 9 |
| ... | ... |
| NOM_PWR | 4 |
| INIT_PWR | 5 |
| PWR_STEP | 3 |
| NUM_SEP | 4 |
| ... | ... |
| PSIST(0-9) | 6 |
| PSIST(X) (10 <= X <= 15) | 3 |
| ... | ... |
| PROBE_BKOFF | 4 |
| BKOFF | 4 |
| ... | ... |

PILOT_PN: Pilot PN sequence offset index. The base station may set this field to the pilot PN sequence offset for this base station, in units of 64 PN chips.

NOM_PWR: Nominal transmit power offset. The base station may set this field to the correction factor to be used by a mobile station in the open loop power estimate, expressed as a two's complement value in units of 1 dB INIT_PWR: Initial power offset. The base station may set this field to the correction factor to be used by a mobile station in the open loop power estimate for the initial transmission on an Enhanced Access Channel, expressed as a two's complement value in units of 1 dB.

PWR_STEP: Power increment. The base station shall set this field to the value by which a mobile station is to increase their transmit power between successive access probes in an access probe sequence, in units of 1 dB.

NUM_STEP: Number of access probes. The base station shall set this field to one less than the maximum number of access probes a mobile station is to transmit in a single access probe sequence.

PSIST(0-9): Persistence value for access overload classes 0 through 9. If mobile stations in access overload classes 0 through 9 are permitted to transmit requests on the ACH, the base station may set this field to the persistence value to be used. If such mobile stations are not permitted to transmit requests on the ACH, the base station may set this field to '11111'.

PSIST(X): Persistence value for access overload class X where 10<=X<=15.

PROBE_BKOFF: Access Channel probe back-off range. The base station may set this field to one less than the maximum number of slots a mobile station is to delay due to random back-off between consecutive enhanced access probes.

BKOFF: Access Channel probe sequence back-off range. The base station may set this field to one less than the maximum number of slots a mobile station is to delay due to random back-off between successive enhanced access probe sequences.

Table 3 shows a part of Enhanced Access Parameters Message. Below table mainly shows parameters related with basic access mode. Generic Access Parameters Message has a similar structure to the Enhanced Access Parameters Message.

TABLE 3

| Field | Length (bits) |
|---|---|
| PILOT_PN | 9 |
| ... | ... |
| PSIST_PARMS_INCL | 1 |
| PSIST_PARMS_LEN | 0 or 5 |
| PSIST(0-9)_EACH | 0 or 6 |
| PSIST(X)_EACH (10<=X<=15) | 0 or 3 |
| ... | ... |
| NUM_MODE_PARM_REC | 3 |
| NUM_MODE_PARM_REC + 1 occurrences of the following record: {(NUM_MODE_PARM_REC + 1) | |
| EACH_NOM_PWR | 5 |
| EACH_INIT_PWR | 5 |
| EACH_PWR_STEP | 3 |
| EACH_NUM_STEP | 4 |
| EACH_PREAMBLE_ENABLED | 1 |
| EACH_PREAMBLE_NUM_FRAC | 0 or 4 |
| EACH_PREAMBLE_FRAC_DURATION | 0 or 4 |
| EACH_PREAMBLE_OFF_DURATION | 0 or 4 |
| EACH_PREAMBLE_ADD_DURATION | 0 or 4 |
| RESERVED | 6 |
| EACH_PROBE_BKOFF | 5 |
| EACH_BKOFF | 5 |
| EACH_SLOT | 6 |
| EACH_SLOT_OFFSET1 | 6 |
| EACH_SLOT_OFFSET2 | 6 |
| RERSERVED | 0-7 (as needed) |
| }(NUM_MODE_PARM_REC + 1) | |
| ... | ... |
| NUM_EACH_BA | 5 |
| EACH_BA_RATES_SUPPORTED | 8 |
| ... | ... |

PILOT_PN is same as defined in APM.

PSIST(0-9)_EACH and PSIST(X)_EACH are same as PSIST(0-9) and PSIST(X) but optionally included in accordance with PSIST_PARMS_INCL.

NUM_MODE_PARM_REC: The number of mode-specific parameter records. The base station may set this field to the number of mode-specific parameter records included in the message, minus one. The mode includes a basic access mode and a reservation access mode.

EACH_NOM_PWR, EACH_INIT_PWR, EACH_PWR_STEP and EACH_NUM_STEP are same as NUM_PWR, INIT_PWR, PWR_STEP and NUM_STEP except that these fields are used for the Enhanced Access Channel.

EACH_PROBE_BKOFF and EACH_BKOFF are same as PROBE_BKOFF and BKOFF, except that these fields are used for the Enhanced Access Channel.

EACH_PREAMBLE_ENABLED: Preamble enabled indicator for the Enhanced Access Channel. The base station shall set this field to '1' if EACH preambles related information is included; otherwise, the base station may set this field to '0'.

EACH_PREAMBLE_NUM_FRAC: The number of fractional preambles on the Enhanced Access Channels. If EACH_PREAMBLE_ENABLED is set to '1', the base station may set this field to the number of fractional preambles minus one on the Enhanced Access Channels; otherwise, the base station may omit this field.

EACH_PREAMBLE_FRAC_DURATION: Fractional preamble duration on the Enhanced Access Channels. If EACH_PREAMBLE_ENABLED is set to '1', the base station may set this field to the fractional preamble duration minus one on an Enhanced Access Channel, in units of 1.25 ms; otherwise, the base station may omit this field.

EACH_PREAMBLE_OFF_DURATION: Fractional preamble gated-off duration on the Enhanced Access Channels. If EACH_PREAMBLE_ENABLED is set to '1', the base station may set this field to the fractional preamble gated-off duration (in units of 1.25 ms) after the transmission of each fractional preamble on an Enhanced Access Channel; otherwise, the base station shall omit this field.

EACH_PREAMBLE_ADD_DURATION: Additional preamble duration on the Enhanced Access Channels. If EACH_PREAMBLE_ENABLED is set to '1', the base station may set this field to the additional preamble duration on an Enhanced Access Channel, in units of 1.25 ms; otherwise, the base station may omit this field.

EACH_SLOT: Slot duration for the Enhanced Access Channels. The base station may set this field to N where the slot duration of the Enhanced Access Channel is (N+1)*1.25 ms. The base station may set this field to a value between 0 and 63.

EACH_SLOT_OFFSET1: First slot offset for the Enhanced Access Channels. The base station may set this field so that the Enhanced Access Channel has a slot offset equal to (EACH_ID*EACH_SLOT_OFFSET2+EACH_SLOT_OFFSET1) mod (EACH_SLOT+1), where EACH_ID is the Enhanced Access Channel Index. The base station may set this field to a value between 0 and 63, in units of 1.25 ms.

EACH_SLOT_OFFSET2: Relative slot offset for the Enhanced Access Channels. The base station may set this field so that the Enhanced Access Channel has a slot offset equal to (EACH_ID*EACH_SLOT_OFFSET2+EACH_SLOT_OFFSET1) mod (EACH_SLOT+1), where EACH_ID is the Enhanced Access Channel Index. The base station may set this field to a value between 0 and 63, in units of 1.25 ms.

NUM_EACH_BA: Number of Enhanced Access Channels used for the Basic Access Mode. The base station may set it to the number of Enhanced Access channels used for the Basic Access mode minus one.

NUM_BA_RATES_SUPPORTED: Supported rate words for the Basic Access mode on the Enhanced Access Channels. The base station may set each subfield of the EACH_BA_RATES_SUPPORTED field as follows: the base station may set the subfield to '1' if the corresponding mode in Table 4 is allowed; otherwise the base station may set the subfield to '0'.

TABLE 4

EACH and R-CCCH Data Rate and Frame Size

| Subfield | Length (bits) | Subfield Description |
| --- | --- | --- |
| RATE_SIZE_1 | 1 | 9600 bps, 20 ms frame size |
| RATE_SIZE_2 | 1 | 19200 bps, 20 ms frame size |
| RATE_SIZE_3 | 1 | 19200 bps, 10 ms frame size |
| RATE_SIZE_4 | 1 | 38400 bps, 20 ms frame size |
| RATE_SIZE_5 | 1 | 38400 bps, 10 ms frame size |
| RATE_SIZE_6 | 1 | 38400 bps, 5 ms frame size |
| RESERVED | 2 | Reserved |

Example

In the conventional random access procedures, access parameters are defined for normal mobile station, which means non-M2M mobile station in the description. And, in conventional random access procedures, congestion is controlled in accordance with a persistence test using a persistence probability value. The persistence probability value is signaled through PSIST fields in APM, EAPM and the like.

As a result, Access Parameters other than the persistence probability cannot be customized during congestion. This is not matter since normal mobile stations cause network access congestion under controllable extent even though only the persistence probability is employed. However, for M2M mobile stations in cdma2000 and other systems, possible enormous number of M2M mobile stations being involved in congestion may lead to serious problems. For example, access attempts from normal mobile stations can be blocked due to large number of M2M mobile stations being involved in congestion. This kind of situation will be aggravated when more M2M mobile stations try to access a network system, e.g., in emergency situation. That is, for a M2M situation, mere control of persistence probability can increase the number of backlogged M2M mobile stations that has not received a permission to access the network system It is thus desirable to devise a mechanism that distributes M2M mobile stations in access attempts (preferably, in addition to the control of persistence probability), thus maintaining the reasonable numbers of M2M mobile stations successfully accommodated in the network system. In this regard, in order to solve the problem of large number of simultaneous access by M2M devices, various contributions were submitted in 3GPP2. Among the various contributions, C22-20120425-004 (A Priority Based Access Overload Control Scheme for 1x RevF) and C22-20120416-020 (Control of Access Parameters for M2M Communications to Resolve Congestion) provides following solutions.

TABLE 5

Solution of C22-20120425-004

BS operations
    BS monitors a load on the access channel. When congestion occurs, BS advertises a 3-bit
Network Access Priority (NAP) level in APM/GAPM. When there is no congestion, BS uses a 1-
bit Network Overload Indicator (NOI) in the APM/GAPM to indicate access priority control is off.
    When access priority control is enabled, BS adjusts the NAP according to the network load.
BS may also adjust a Persistence value for class Access Overload Control (ACCOLC) 15 when
NAP is changed, to accommodate a potentially large number of devices suddenly becoming active.
    MS operations
    If NOI bit is not included in the GAPM/APM
        MS uses the last digit of its International Mobile Subscriber Identifier M (IMSI_M) to
determine its access overload class (e.g., ACCOLC 0~9)
        MS follows a normal access procedure.

TABLE 5-continued

Solution of C22-20120425-004

If NOI bit is included in the GAPM/APM
    A M2M device uses overload classes ACCOLC 14 or 15 for access.
    Each M2M device is provisioned or preconfigured with a Device Access Priority (DAP) parameter.
    M2M device shall check NOI in GAPM/APM before it initiates an access attempt.
    If NOI is '0' (i.e. there is no congestion), M2M device shall perform the normal access procedure using ACCOLC 14.
        If NAP is '1' (i.e. there is congestion), MS shall compare its DAP with the advertised NAP.
        If its DAP is smaller than the advertised NAP, it shall hold off its access attempt and try again only when the overhead message has changed.
        If its DAP is equal to the advertised NAP, it shall perform the normal access procedure using overload class ACCOLC 15.
        If its DAP is larger than the advertised NAP, it shall perform the normal access procedure using overload class ACCOLC 14.
        When M2M device responds to Forward Link (FL) messages, DAP/NAP process is disabled.
        In case of emergency, a M2M device should bypass the above access priority control procedures and access the network using parameters of the emergency access class.
        In case of urgent data, a M2M device should bypass the above access priority control procedures and access the network using its appropriate overload class (based on the last digit of IMSI_M), ACCOLC 0 through ACCOLC 9.
    BS operations
    A message, that carries access-related parameter(s), may include an optional separate section which conveys access parameters (e.g., EACH_PROBE_BKOFF, EACH_BKOFF; see, table 3) which is not persistence probability, to be used by the M2M MS for access. The inclusion of such parameter(s) is indicated by a flag, which signals whether system is under congestion or not.
        When a flag is "ON", M2M MSs will use access parameter(s) designed for congestion.
        One more bit is allocated to each of these 2 parameters for possible longer values.

However C22-20120425-004 has following problems:

First, if congestion occurs (i.e., NOI=1) and DAP<NAP, access of M2M device is blocked unless NOI and/or NAP value is changed.

Second, BS broadcasts NAP & NOI in the GAPM and APM periodically and less frequently, which means that access of M2M devices may be blocked so long time.

Third, congestion level can be increased severely right after NAP & NOI setting allows them to access because M2M devices which have been blocked try to access simultaneously.

In addition, C22-20120416-020 has following problems:

If congestion occurs (e.g., flag is "ON"), all the M2M devices use longer back-off parameters such as EACH_PROBE_BKOFF, EACH_BKOFF, which can increase the access latency of M2M devices with high priority.

Therefore, in order to address above problems of the prior art, a solution to meet the following requirements is needed even in congestion case:

High priority M2M device can access with less latency.
Low priority M2M device can access at least even with long delay.
When network overloaded condition is released, sudden congestion should be avoided.

Hereinafter, the present invention will be described in detail. In the description, "normal Back-Off (BO) or normal Access Procedure" may mean an access procedure using normal access parameter(s) (e.g., PROBE_BKOFF, BKOFF; see, table 2). In addition, "extended Back-Off (BO) or extended Access Procedure" may mean an access procedure using extended access parameter(s) (e.g., EACH_PROBE_BKOFF, EACH_BKOFF; see, table 3). PROBE_BKOFF and BKOFF are N-bits (e.g., 4-bits). EACH_PROBE_BKOFF, EACH_BKOFF are M-bits (M>N) (e.g., 5-bits). Thus, a back-off window in the extended back-off can be larger than a back-off window in the normal back-off, thereby M2M devices can be distributed more widely and long delayed.

Case 1

In case 1, when a congestion occurs, BS may indicate either blocking of access from low priority M2M devices (e.g., M2M devices with DAP<NAP & NOI=1) or allowance of access from the low priority M2M devices with long delay (e.g., extended back-off operation). The indication is carried out by using a newly defined indicator field (hereinafter, New Indicator field, NI field or simply NI) or by re-using a value of a pre-defined field (e.g., NOD.

Figure 6:
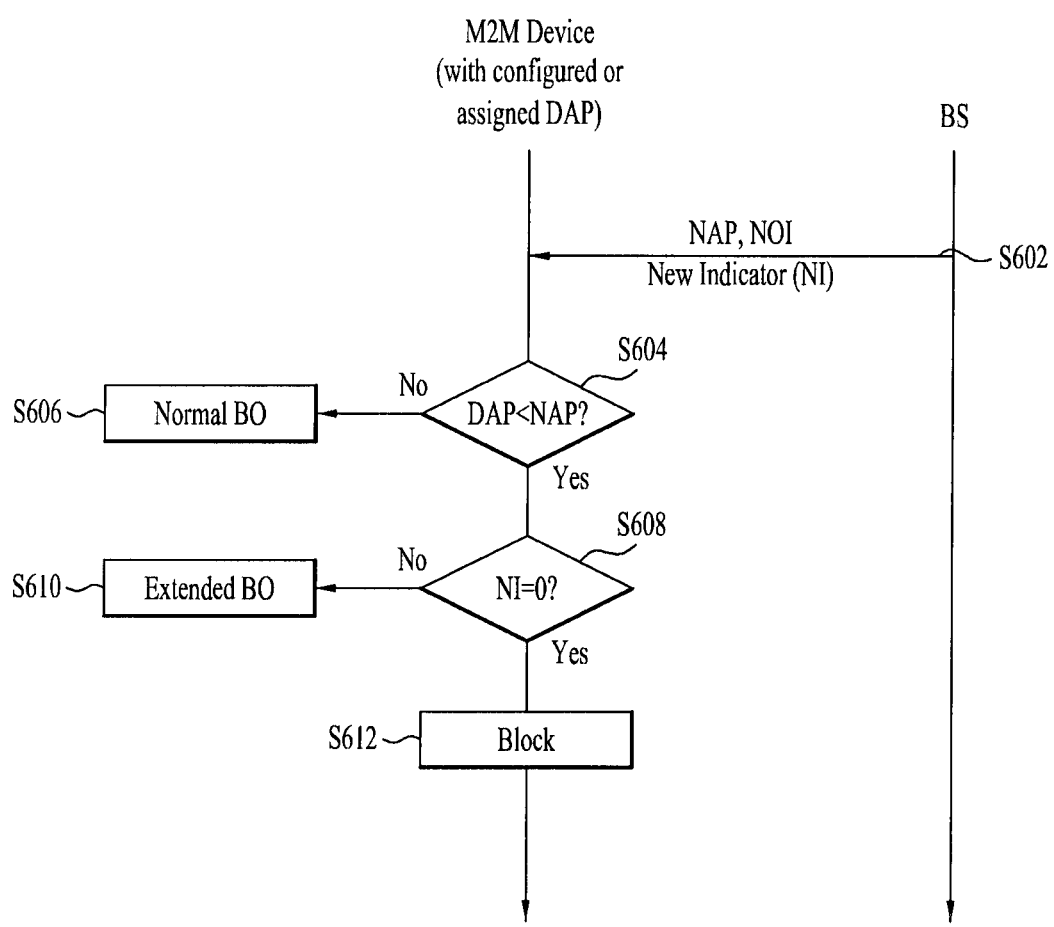
FIGS. 6-9 illustrate examples of network access procedure in accordance with the present invention.

FIG. 6 illustrates an example of network access procedure, in which a newly defined indicator field is used for access control of low priority devices.

Referring to FIG. 6, a BS may transmit, to a wireless device (e.g., M2M device), a message including at least one of a Network Access Priority (NAP) field, a Network Overload Indicator (NOI) field, and a New Indicator (NI) field (S602). In this example, for the purpose of explanation, it is assumed that the NOI field is set to a value indicating for example a congestion situation (e.g., NOI=1). The message may be for example GAPM, APM, etc. A value of the NAP field may indicate a network access priority level. A value of the NOI field may indicate a network overload level. The value of the NOI field may be 1-bit indicator indicating one of congestion or non-congestion. In addition to the NOI field, the NI field may be used for the BS to control network access of the M2M device, in consideration of various conditions including network congestion situation. In particular, the value of the NI field may be 1-bit flag indicating whether network access of the M2M device is allowed or blocked.

Then, the M2M device may check whether it is a low priority M2M device or not, by comparing its Device Access Priority (DAP) with the NAP (S604). In the description, "DAP<NAP" means that the M2M device is a low priority M2M device. As a result, if the M2M device is not a low priority M2M device (i.e., DAP>=NAP), the M2M device may perform a normal back-off operation (S606). However, if the M2M device is the low priority M2M device (i.e., DAP<NAP), the M2M device may check, by using the NI field, whether network access of a low priority M2M device is allowed or not (S608). If the NI field is set to a value (e.g., NI=1) allowing network access of low priority M2M device, the M2M device can perform an extended back-off operation based on the extended back-off parameter (S610). Meanwhile, if the NI field is set to a value (e.g., NI=0) blocking network access of low priority M2M device, network access of the M2M device is blocked (S612).

Figure 7:
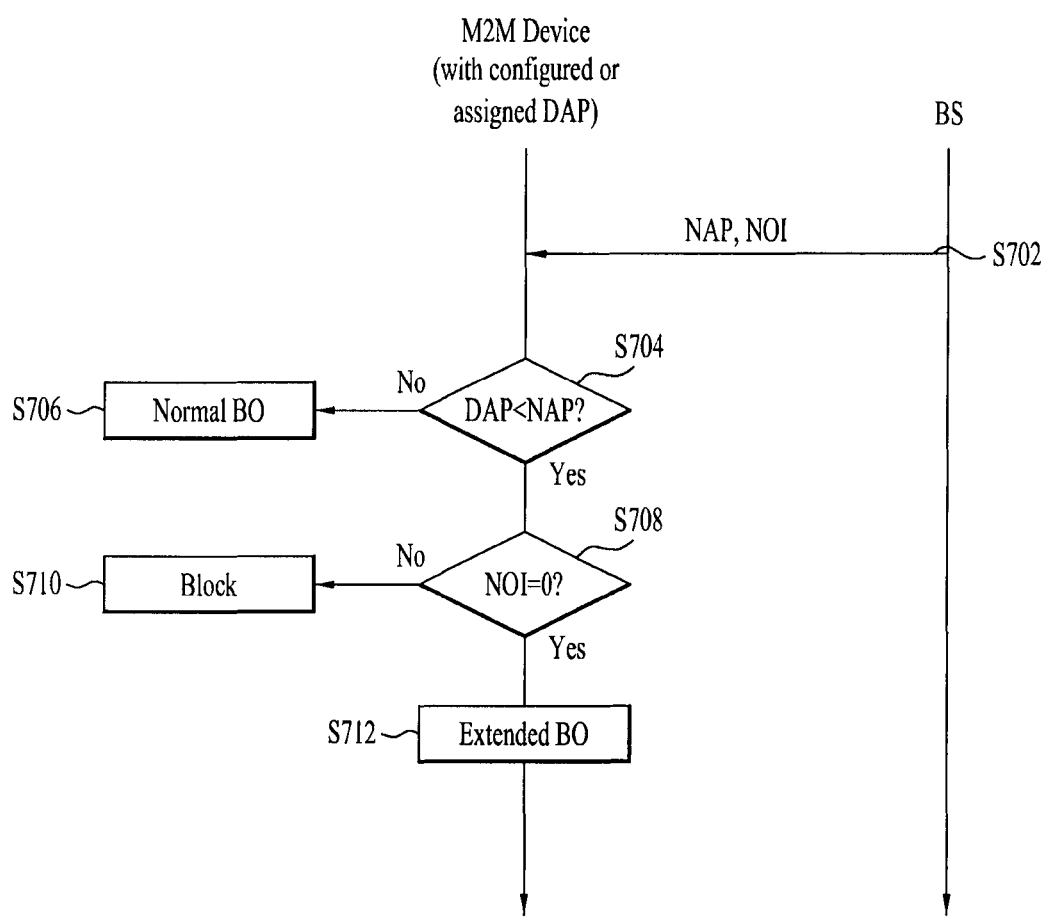

FIG. 7 illustrates an example of network access procedure, in which a pre-defined field is re-used for access control of low priority devices. FIG. 7 is substantially identical with FIG. 6, except that NOI field is re-used for access control of low priority devices.

Referring to FIG. 7, a BS may transmit, to a wireless device (e.g., M2M device), a message including at least one of a Network Access Priority (NAP) field and a Network Overload Indicator (NOI) field (S702). The message may be for example GAPM, APM, etc. In this example, the NOI field may be used to indicate a network overload level as well as used for the BS to control network access of the M2M device, in consideration of various conditions including network congestion situation. For example, the value of the NOI field may be also used to indicate whether network access of the M2M device, preferably a low priority M2M device, is allowed or blocked.

Then, the M2M device may check whether it is the low priority M2M device or not, by comparing its Device Access Priority (DAP) with the NAP (S704). As a result, if the M2M device is not the low priority M2M device (i.e., DAP>=NAP), the M2M device can perform a normal back-off operation for network access (S706). However, if the M2M device is the low priority M2M device (i.e., DAP<NAP), the M2M device may check, by using the NOI field, whether network access of a low priority M2M device is allowed or not (S708). In particular, if the NOI field is not included or if the NOI field is included and set to a value (e.g., NOI=0) corresponding to a non-congestion, the network access of low priority M2M device can be allowed with an extended back-off operation based on the extended back-off parameter (S710). Meanwhile, if the NOI field is included and set to a value (e.g., NOI=1) corresponding to a congestion, network access of the M2M device is blocked (S712).

Case 2

In case 2, when a congestion occurs, a BS may indicate either blocking of access from low priority M2M devices (e.g., M2M devices with DAP<NAP & NOI=1) or allowance of access from low priority M2M devices. In case 2, low priority M2M devices may perform a normal random back-off operation or an extended random back-off operation based on the result of probability check (see, FIG. 5). To this end, a newly defined indication field (e.g., Back-off Type field, BOtype field) can be used for a low priority M2M device to check whether it performs a normal random back-off operation or an extended random back-off operation based on the result of probability check.

Figure 8:
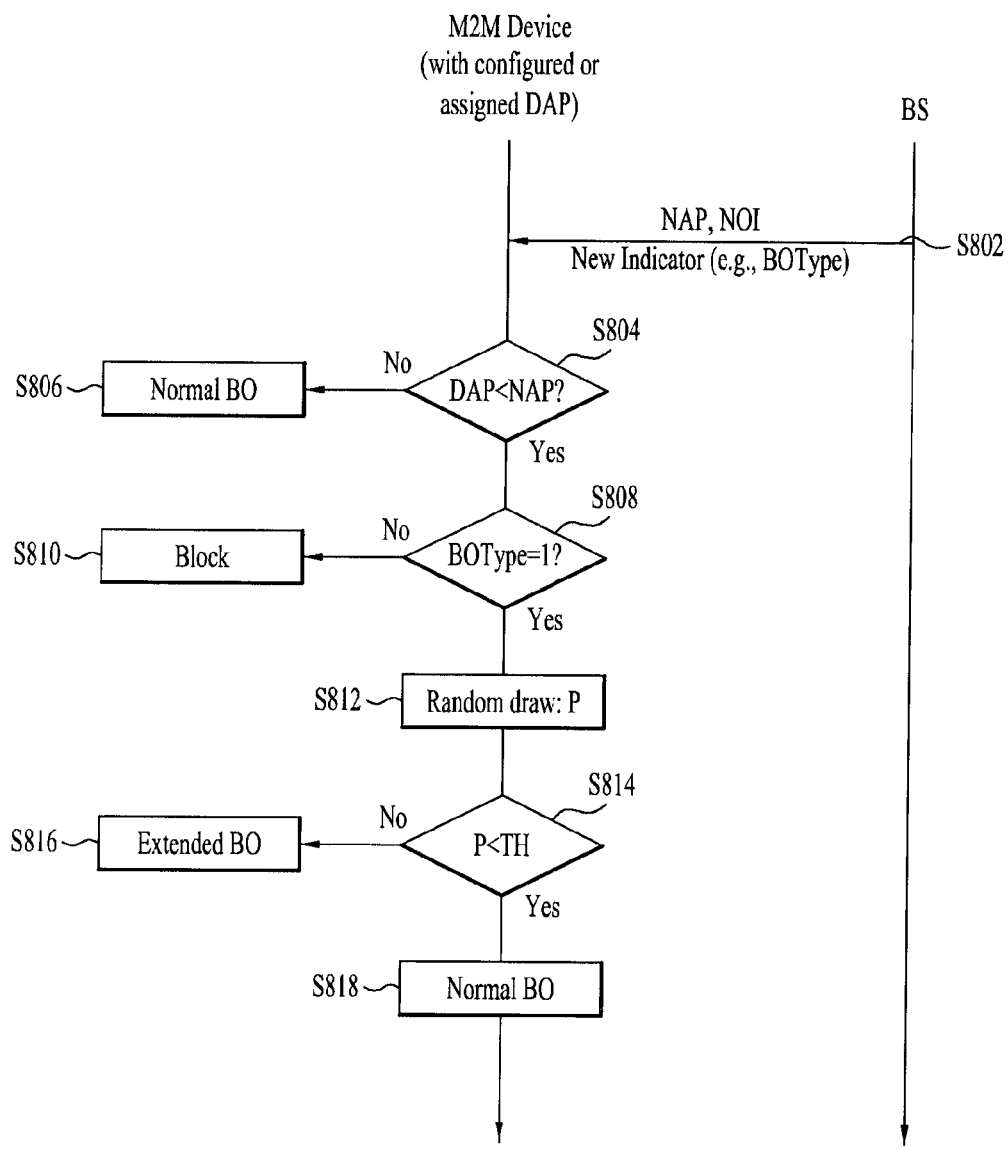

FIG. 8 illustrates an example of network access procedure, in which a newly defined indicator field is used for access control of low priority devices.

Referring to FIG. 8, a BS may transmit, to a wireless device (e.g., M2M device), a message including at least one of a Network Access Priority (NAP) field, a Network Overload Indicator (NOI) field, and a New Indicator field (e.g., BOtype field) (S802). In this example, for the purpose of explanation, it is assumed that the NOI field is set to a value indicating for example a congestion situation (e.g., NOI=1). The message may be for example GAPM, APM, etc. In addition to the NOI field, the BOtype field may be used for the BS to control network access of the M2M device, in consideration of various conditions including network congestion situation. In particular, the value of the BOtype field may be 1-bit flag indicating whether network access of the M2M device is allowed (based on the result of probability check) or blocked.

Then, the M2M device may check whether it is a low priority M2M device or not, by comparing its Device Access Priority (DAP) with the NAP (S804). As a result, if the M2M device is not a low priority M2M device (i.e., DAP>=NAP) (S804), the M2M device may perform a normal back-off operation (S806). However, if the M2M device is the low priority M2M device (i.e., DAP<NAP) (S804), the M2M device may check, by using the BOtype field, whether network access of a low priority M2M device is allowed or not (S808). If the BOtype field is set to a value (e.g., BOtype=0) blocking network access of the low priority M2M device (S808), network access of the M2M device is blocked (S810). Meanwhile, if the BOtype field is set to a value (e.g., BOtype=1) allowing network access of the low priority M2M device (S808), the M2M device can perform either a normal back-off operation or an extended back-off operation based on the result of probability check (S812~S818). In the probability check, the M2M device select a random number and checks if the selected random number meets the certain threshold to decide whether performing normal back-off operation or extended back-off operation. In particular, the M2M device draws a random value P (S812). Then, if the random value P is less than a threshold value (TH) (S814), the extended back-off operation can be performed for network access (S816). But, if the random value P is no less than the threshold value (TH) (S814), the normal back-off operation can be performed for network access (S816).

Figure 9:
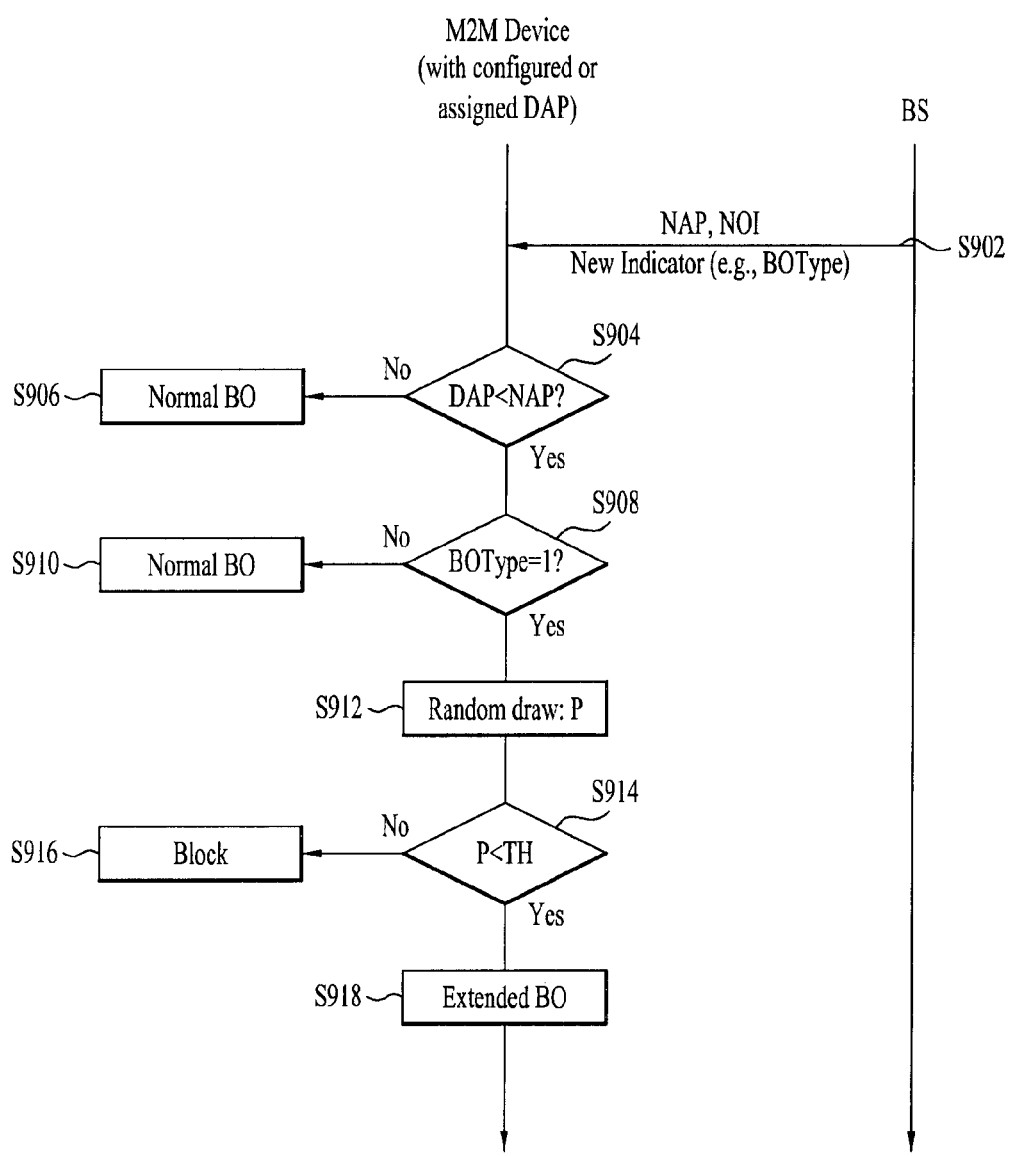

FIG. 9 illustrates an example of network access procedure, in which a newly defined indicator field is used for access control of low priority devices.

Referring to FIG. 9, a BS may transmit, to a wireless device (e.g., M2M device), a message including at least one of a Network Access Priority (NAP) field, a Network Overload Indicator (NOI) field, and a New Indicator field (e.g., BOtype field) (S802). n this example, for the purpose of explanation, it is assumed that the NOI field is set to a value indicating for example a congestion situation (e.g., NOI=1). The message may be for example GAPM, APM, etc. In addition to the NOI field, the BOtype field may be used for the BS to control network access of the M2M device, in consideration of various conditions including network congestion situation.

Then, the M2M device may check whether it is a low priority M2M device or not, by comparing its Device Access Priority (DAP) with the NAP (S904). As a result, if the M2M device is not a low priority M2M device (i.e., DAP>=NAP) (S904), the M2M device may perform a normal back-off operation (S906). However, if the M2M device is the low priority M2M device (i.e., DAP<NAP) (S904), the M2M device may check, by using the BOtype field, whether network access of a low priority M2M device is allowed or not (S908). If the BOtype field is set to a value (e.g., BOtype=0) allowing network access of the low priority M2M device without restriction (S908), the M2M device can perform a normal back-off operation (S910). Meanwhile, if the BOtype field is set to a value (e.g., BOtype=1) restricting network access of the low priority M2M device (S908), network access of the M2M device is either blocked or can be performed by using an extended back-off operation based on the result of probability check (S912~S918). In particular, the M2M device draws a random value P (S912). Then, if the random value P is less than a threshold value (TH) (S914), network access of the M2M device is blocked (S916). But, if the random value P is no less than the threshold value (TH) (S914), the extended back-off operation can be performed for network access (S916).

In combination with the above examples, access priority among low priority M2M devices can be broken down (or, re-assigned or re-configured) according to their DAP as follows when newly defined indication flag is "ON"

For CASE 1, different extended back-off window can be defined. In particular, M2M device with lower DAP can have a longer extended back-off window. To this end, extended back-off window depending on DAP can be explicitly signaled by a BS or implicitly calculated by M2M device based on its DAP, as follows.

Example of Explicit Signaling

If NAP value equals 4, following extended back-off window parameters can be signaled by BS, for DAP(s) lower than the NAP=4.

for DAP 3: information indicating the extended back-off window=4.
for DAP 2: information indicating the extended back-off window=8.
for DAP 1: information indicating the extended back-off window=16.
for DAP 0: information indicating the extended back-off window=32.

Example of Implicit Calculation

Extended back-off window can be calculated by using DAP as follows:

$$\text{Extended back-off window}=(\text{normal back-off window})\times N^{(NAP-DAP)} \quad \text{Equation 1:}$$

where the normal back-off window is calculated by using BKOFF and PROBE_BKOFF (see, table 2). N is an integer of 2 or more, and can be signaled by the network node (e.g., BS) or predefined. The NAP and the DAP are same as defined above For example, if NAP=4, normal back-off window=4, N=2 and DAP=3, then extended back-off window=8.

For CASE 2, different random number selection criterion can be defined for following two cases. M2M device with lower DAP can have high priority to select the random number performing an extended random back-off operation. Alternatively, M2M device with lower DAP can have high priority to select the random number blocking its access. To this end, a threshold value and a random number window can be explicitly signaled by BS or implicitly calculated by M2M device based on its DAP.

Example of Explicit Signaling

If NAP value equals 4, following extended back-off window parameters can be signaled by BS, for DAP(s) lower than the NAP=4.

for DAP 3: information indicating the threshold=0.1.
for DAP 2: information indicating the threshold=0.2.
for DAP 1: information indicating the threshold=0.4.
for DAP 0: information indicating the threshold=0.8.

It is assumed that random value is selected between 0 and 1. Extended back-off window can be also signaled in a similar way.

Example of Implicit Calculation

The threshold can be calculated by using DAP as follows:

$$\text{The threshold}=(\text{random number window})/\{N\times(\text{NAP}-\text{DAP})\} \quad \text{Equation 2:}$$

where the random number window represents a range of a random number. For example, if the random number is selected between 0 and 100, the random number window is 100. N is an integer of 2 or more, and can be signaled by the network node (e.g., BS) or predefined. The NAP and the DAP are same as defined above.

For example, if NAP=4, random number window=16, N=2, and DAP=2, then, the threshold is 4.

Above description exemplifies cases that the NOI is 1-bit field, but multiple-bit representation for NOI is also provided. In particular, the NOI field can be defined by more than one bit (e.g., 2 bits) in order to provide the level of overload to the M2M devices with respectively different levels of priority. And, if the periods of Extended Back-off (BO) are not explicitly or implicitly signaled, the multiple-bit NOI can be used for a low priority M2M device to decide how long it is supposed to wait.

Figure 10:
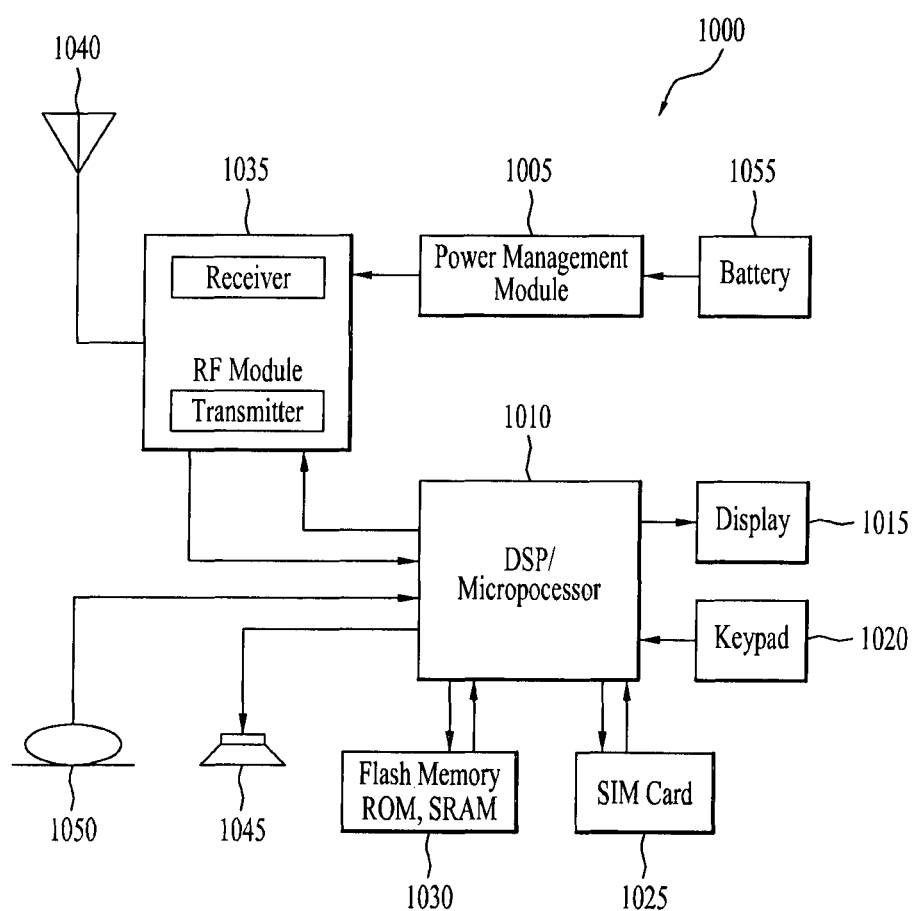
FIG. 10 illustrates a block diagram of a wireless device 10.

FIG. 10 illustrates a block diagram of a wireless device 1000. The wireless device 1000 includes a M2M device or a delay-tolerant device. The wireless device 1000 includes a processor (or digital signal processor) 1010, RF module 1035, power management module 1005, antenna 1040, battery 1055, display 1015, keypad 1020, memory 1030, SIM card 1025 (which may be optional), speaker 1045 and microphone 1050.

A user enters instructional information, such as a telephone number, for example, by pushing the buttons of a keypad 1020 or by voice activation using the microphone 1050. The microprocessor 1010 receives and processes the instructional information to perform the appropriate function, such as to dial the telephone number. Operational data may be retrieved from the Subscriber Identity Module (SIM) card 1025 or the memory module 1030 to perform the function. Furthermore, the processor 1010 may display the instructional and operational information on the display 1015 for the user's reference and convenience.

The processor 1010 issues instructional information to the RF module 1035, to initiate communication, for example, transmits radio signals comprising voice communication data. The RF module 1035 comprises a receiver and a transmitter to receive and transmit radio signals. An antenna 1040 facilitates the transmission and reception of radio signals. Upon receiving radio signals, the RF module 1035 may forward and convert the signals to baseband frequency for processing by the processor 1010. The processed signals would be transformed into audible or readable information outputted via the speaker 1045, for example. The processor 1010 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS and a wireless device. A specific operation which has been described as being performed by the eNB (or BS) may be performed by an upper node of the BS as the case may be. In other words, it will be apparent that various operations performed for communication with the wireless device in the network which includes a plurality of network nodes along with the BS can be performed by the BS or network nodes other than the BS. The BS may be replaced with terms such as fixed station, Node B, eNode B (eNB), and access point. Also, the term wireless device may be replaced with terms such as mobile station (MS), mobile subscriber station (MSS), M2M device, M2M MS, MTC device, MTC MS, D2D device, D2D MS, a delay-tolerant device, a delay-tolerant MS and a user equipment (UE).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be used for a method, a wireless device, a base station, a relay in a wireless communication system.

The invention claimed is:

1. A method of controlling network access at a wireless device in a wireless communication system, the method comprising:
   receiving a first field for indicating a network overload situation and a second field for indicating a network access priority; and
   receiving at least an N-bit field for indicating a first back-off window or an M-bit field for indicating a second back-off window,
   wherein if a configured priority is equal to or higher than the network access priority, a random access (RA) procedure is performed using the first back-off window,
   wherein if the configured priority is lower than the network access priority and the first field is set to 1, the RA procedure is barred; and
   wherein if the configured priority is lower than the network access priority and the first field is set to 0, the RA procedure is performed using the second back-off window.

2. The method of claim 1, wherein the first back-off window is smaller than the second back-off window.

3. The method of claim 1, wherein M is larger than N.

4. The method of claim 1, further comprising: receiving a third field,
   wherein if the configured priority is lower than the network access priority and the third field is set to a first value, the RA procedure is barred; and
   wherein if the configured priority is lower than the network access priority and the third field is set to a second value, the RA procedure is performed using the second back-off window.

5. The method of claim 1, further comprising: receiving a third field,
   wherein if the configured priority is lower than the network access priority, the first field is set to 1, and the third field is set to a first value, the RA procedure is barred; and
   wherein if the configured priority is lower than the network access priority and the third field is set to a second value, the RA procedure is performed using the first back-off window or the second back-off window, based on whether a random-generated value is larger than a threshold value.

6. The method of claim 1, further comprising: receiving a third field,
   wherein if the configured priority is lower than the network access priority, the first field is set to 1, and the third field is set to a first value, the RA procedure is barred; and
   wherein if the configured priority is lower than the network access priority the third field is set to a second value, the RA procedure is either barred or performed using the second back-off window, based on whether a random-generated value is larger than a threshold value.

7. The method of claim 1, wherein the wireless device is a delay-tolerant wireless device.

8. A wireless device for used in a wireless communication system, the wireless device comprising:
   a radio frequency unit; and
   a processor configured to:
      receive a first field for indicating a network overload situation and a second field for indicating a network access priority; and
      receive at least an N-bit field for indicating a first back-off window or an M-bit field for indicating a second back-off window,
   wherein if a configured priority is equal to or higher than the network access priority, a random access (RA) procedure is performed using the first back-off window,
   wherein if the configured priority is lower than the network access priority and the first field is set to 1, the RA procedure is barred; and wherein if the configured priority is lower than the network access priority and the first field is set to 0, the RA procedure is performed using the second back-off window.

9. The wireless device of claim 8, wherein the first back-off window is smaller than the second back-off window.

10. The wireless device of claim 8, wherein M is larger than N.

11. The wireless device of claim 8, wherein the processor is further configured to receive a third field,
wherein if the configured priority is lower than the network access priority and the third field is set to a first value, the RA procedure is barred; and
wherein if the configured priority is lower than the network access priority and the third field is set to a second value, the RA procedure is performed using the second back-off window.

12. The wireless device of claim 8, wherein the processor is further configured to receive a third field,
wherein if the configured priority is lower than the network access priority, the first field is set to 1, and the third field is set to a first value, the RA procedure is barred; and
wherein if the configured priority is lower than the network access priority and the third field is set to a second value, the RA procedure is performed using the first back-off window or the second back-off window, based on whether a random-generated value is larger than a threshold value.

13. The wireless device of claim 8, wherein the processor is further configured to receive a third field,
wherein if the configured priority is lower than the network access priority, the first field is set to 1, and the third field is set to a first value, the RA procedure is barred; and
wherein if the configured priority is lower than the network access priority the third field is set to a second value, the RA procedure is either barred or performed using the second back-off window, based on whether a random-generated value is larger than a threshold value or not.

14. The wireless device of claim 8, wherein the wireless device is a delay-tolerant wireless device.

* * * * *